United States Patent
Rajagopalan et al.

(10) Patent No.: US 9,621,503 B2
(45) Date of Patent: Apr. 11, 2017

(54) SYSTEM AND METHOD TO ENABLE PRIVATE CONVERSATIONS AROUND CONTENT

(75) Inventors: Anand Rajagopalan, Bangalore (IN); Hemanth Sambrani, Bangalore (IN); Jonathan Katzman, San Francisco, CA (US); Alexandre Linares, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 111 days.

(21) Appl. No.: 13/357,598

(22) Filed: Jan. 24, 2012

(65) Prior Publication Data

US 2013/0191762 A1    Jul. 25, 2013

(51) Int. Cl.
| | |
|---|---|
| *H04L 12/58* | (2006.01) |
| *G06Q 10/10* | (2012.01) |
| *H04L 12/18* | (2006.01) |
| *G06Q 50/00* | (2012.01) |
| *H04N 21/4788* | (2011.01) |

(52) U.S. Cl.
CPC ............ *H04L 51/32* (2013.01); *G06Q 10/10* (2013.01); *H04L 12/1818* (2013.01); *G06Q 50/01* (2013.01); *H04N 21/4788* (2013.01)

(58) Field of Classification Search
CPC ............................... G06Q 50/01; G06Q 10/10
USPC ......................................................... 715/753
See application file for complete search history.

(56) References Cited

U.S. PATENT DOCUMENTS

| | | | | |
|---|---|---|---|---|
| 6,941,345 B1* | 9/2005 | Kapil | ................. | H04L 12/1818 709/206 |
| 2007/0266342 A1* | 11/2007 | Chang et al. | ................. | 715/810 |
| 2008/0052634 A1* | 2/2008 | Fishkin et al. | ................. | 715/753 |
| 2008/0147810 A1* | 6/2008 | Kumar et al. | ................. | 709/206 |
| 2010/0037153 A1* | 2/2010 | Rogers | ................. | G06F 3/0481 715/758 |
| 2012/0265770 A1* | 10/2012 | Desjardins et al. | .......... | 707/748 |

* cited by examiner

*Primary Examiner* — Jennifer To
*Assistant Examiner* — Ashley Fortino
(74) *Attorney, Agent, or Firm* — Martine Penilla Group, LLP

(57) ABSTRACT

Methods, system and computer readable medium for allowing a user to participate in an online private conversation for a head content includes detecting a selection of the content published on a website hosted by a host. A conversation interface is provided for initiating a private conversation within a context of the content. A comment related to the content is provided and one or more users are selected, using the conversation interface. The selected users are socially related to the user and are selected from one or more social networking sites. A link to the private conversation for the content is generated and the generated link is forwarded to the selected users in a notification inviting the users to participate in the private conversation. The link provides access to the content and the private conversation initiated for the content at the website.

18 Claims, 17 Drawing Sheets

SYSTEM AND METHOD TO ENABLE PRIVATE CONVERSATIONS AROUND CONTENT

BACKGROUND

Field of the Invention

The present invention relates to holding conversations, and more particularly, to holding private conversations in a context of the content of a webpage.

Description of the Related Art

In the digital era, providing content and having interactions related to the presented content has taken on a whole new meaning. For instance, the content of an article is made available to all the users as soon as the article is "published" on the internet. The internet has established itself as an interactive medium wherein users are able to publish articles of interest, facilitate chat, create/participate in discussion groups and interactive blogs. In the highly competitive world of the internet, content providers who publish articles on their website are looking into ways to engage a user in order to increase and retain the traffic to their website. One way the content providers can engage/retain users is by providing customized tools to enable users to participate in conversations on stories/articles published on a content provider's website and postings to weblogs. Additionally, there are a lot of social networking sites that enable users to engage in meaningful interactions with selective group of users on articles published on the internet.

Different content providers and social networking sites provide different types of customized tools that enable users to facilitate conversations with their friends and family about online content. However, these customized tools have some drawbacks or have features that are less than desirable. For instance, some customized tools are provided on the social networking sites that allow users to hold conversations about a content published on a website in an offline mode. As a result, conversations related to the content either lack the context or require unnecessary navigation to obtain the context of the conversation. Some other customized tools use social network plug-ins to enable generation and sharing of conversation for the content but the conversations related to the content are public. Still other customized tools allow creation of circles of friends/families for sharing conversation related to a content using a user's social graph. However, the circle of friends has to be created apriori and the conversations are not provided inline within a context of the content.

It would, therefore, be desirable to have a tool that allows a user to view content on a website and start a conversation with a select group of friends/families that is private and in context of the content.

It is in this context that the embodiments of the invention arise.

SUMMARY

Embodiments of the present invention describe methods, algorithm and a system that allows a user to start private conversations in a context of a head content available on a webpage and share the private conversations with a select group of friends/families from across different networks including social networking sites. The embodiments also enable a user to participate in conversations offline and allow these offline conversations to be updated into the private conversation related to the content on the webpage so other users will be able to access, review and provide feedback on the private conversation. The private conversation is available only to those participants that are invited to participate in the private conversation by a user thereby allowing the user to hold multitude of such private conversations inline in the context of the content selected from the webpage.

It should be appreciated that the present invention can be implemented in numerous ways, such as, methods, systems and computer readable medium. Several inventive embodiments of the present invention are described below.

In one embodiment, a method for allowing a user to participate in an online private conversation for a head content, is disclosed. The method includes detecting a selection, by a user, of the content published on a website hosted by a host. An interface for initiating a private conversation within a context of the content is provided. A comment is provided in relation to the content and one or more users are selected through the interface and invited to participate in the private conversation. The selected one or more users are socially related to the user and are selected from one or more social networking sites. A link to the private conversation related to the content, is generated and the generated link is forwarded to the selected one or more users inviting the users to participate in the private conversation. The generated link provides access to the content and the private conversation initiated for the content at the website.

In yet another embodiment, a method for enabling a private conversation for a content provided on a website is disclosed. The method includes receiving a notification containing a link to the content on the website by a particular user. The link provides access to the content and an invitation to participate in the private conversation initiated by an initiator for the content provided at the website by a host. The private conversation is provided within a context of the selected content and is open to a subset of users selected by the initiator from one or more social networking sites wherein the subset of users are socially related to the initiator. The private conversation is accessed through the link and comments are provided to the content upon viewing the private conversation. The comments are updated to the private conversation in substantial real-time so as to enable other users to access and interact within the context of the content.

In another embodiment, a method for enabling a private conversation for a content provided on a website hosted by a host, is disclosed. The method includes selecting the content at the website by an initiator. A private conversation is initiated within a context of the selected content using a conversation interface provided at the website. One or more users are selected from one or more social networking sites to participate in the private conversation initiated by the initiator through the conversation interface. The one or more selected users are socially related to the initiator. A link to the private conversation is generated and is forwarded to the selected one or more users inviting the users to participate in the private conversation for the content.

In another embodiment, a computer program product encoding program instructions embodied on a computer readable medium is provided. The computer program product includes program instructions for detecting a selection of the content by a user, wherein the content is published on a website hosted by a host. Program instructions for providing an interface for initiating a conversation within a context of the content are also provided. The computer program product also includes program instructions to enable selection of one or more users through the interface and invite them to participate in the conversation wherein the selected one or more users are socially related to the user and are selected from one or more social networking sites. The computer program product further includes program instructions to generate a link to the conversation related to the content and to enable forwarding the generated link to the selected one or more users inviting the users to participate in the conversation. The generated link provides access to the content and the private conversation initiated for the content at the website.

The embodiments of the invention provide an efficient algorithm for enabling a user to start conversation inline within a context of a content published on a website accessible through a network, such as an Internet. The embodiments also enable a user to create 1:few groups/list of friends selected from different networks, including network address books and social networking sites. The embodiments allow users from these different social networks to participate in the conversation offline and allow the offline comments and/or conversations to flow back into the inline private conversation initiated from a specific website hosted on a specific network. The conversations initiated for each content are available only to those users that are invited for viewing and participating in the conversation allowing the users to hold private conversations even within a public forum, such as the Internet. The current embodiments also enable users to have more than one such private conversations on the same content or on different contents available on a website.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIGS. 3a-3f illustrate process flow for a recipient to access the private conversation and post comments, in one embodiment of the invention.

DETAILED DESCRIPTION

Broadly speaking, the embodiments of the present invention provide methods, system and computer readable medium that utilizes a mechanism provided on a website, such as a conversation widget, for creating and sharing inline private conversation for a head content published on the website. An algorithm on a server, along with the mechanism on the website, is able to detect selection of content available on the website hosted by a host and enable initiation of a private conversation within a context of the selected content amongst a select set of users from across a wide spectrum of social networking sites. The mechanism provides an interface that enables an initiator to start the private conversation, provide comments, select users to participate in the private conversation, generate a link to the private conversation and share the link with the selected users so as to enable the users to view and participate in the private conversation. Using the mechanism and the algorithm, an initiator is capable of starting a plurality of private conversations simultaneously with different groups of users within the context of the same selected head content or within the context of different head contents. The participating users for sharing the private conversations are selected on-the-fly and within the context of the content while the initiator is viewing the content. The algorithm also enables an initiator to organize the selected set of users into distinct user groups so as to use these distinct user groups for holding subsequent private conversations in relation to different content within the website.

With the brief overview, subject matter will now be described more fully hereinafter with reference to the accompanying drawings, which form a part thereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Figure 1:
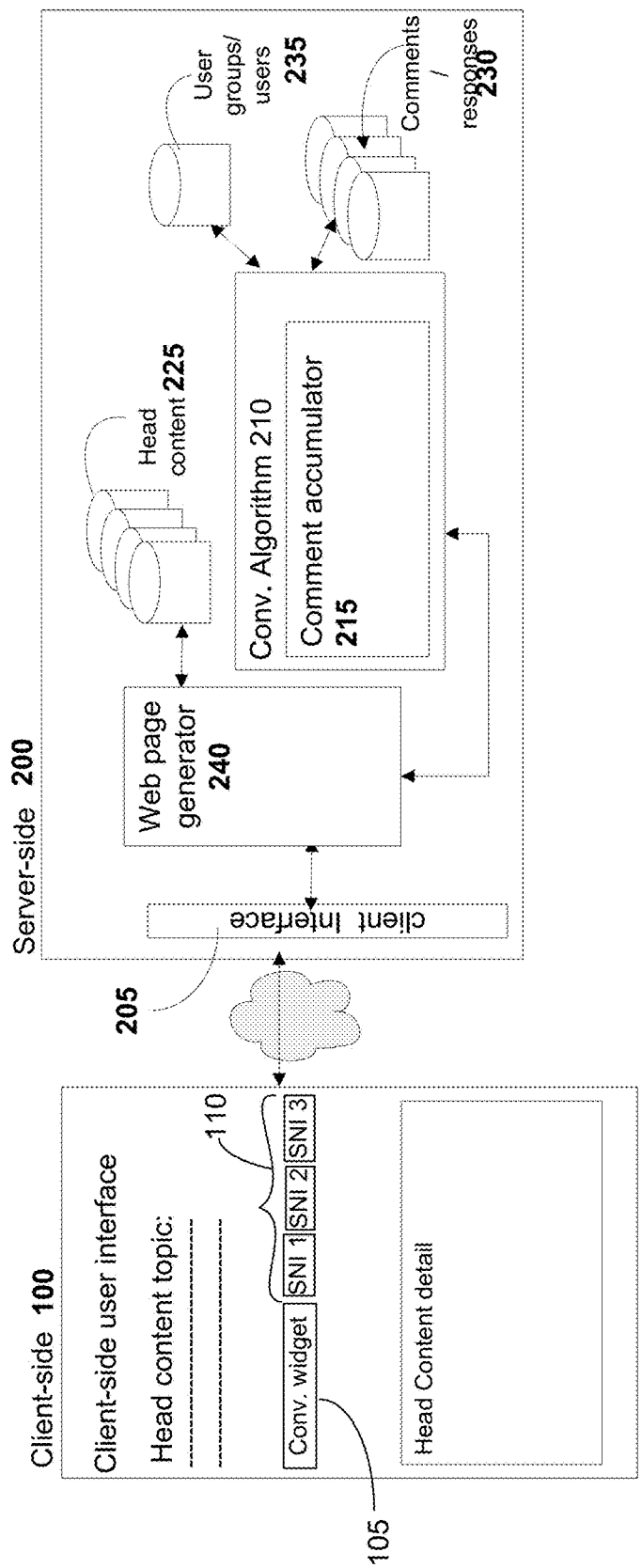
FIG. 1 illustrates a simple block diagram of a system identifying various modules used in enabling a private conversation for a content provided on a website, in one embodiment of the invention.

FIG. 1 illustrates a simple block diagram of a system used in enabling a private conversation for a head content provided on a website. Head content, as used in this application, refers to an article, such as a news article or any article of information or document that is published on a content provider's website. The head content can be in any form including a text, image, audio, video, or any other form that can be rendered on a webpage. For instance, a head content may be a news article headline on a news website. The head content is not restricted to news articles but can be extended to other topics of discussion.

Still referring to FIG. 1, a user accesses a webpage of a content provider, such as news webpage hosted by a host and selects a head content, such as a news article, using a client-side user interface available on a client device 100. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A client interface 205 on a server device 200 receives the user's selection from the client device over a network, such as the Internet, and forwards the selection to a web page generator 240.

The server device may be a content server device that includes a configuration to provide content via a network to another device, such as a client device. A content server may, for example, host a site, such as a social network site, examples of which may include, without limitations, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

The web page generator 240 identifies the selected head content, queries a database, such as a head content database 225, to obtain content for the selected head content. The head content database 225 is a repository that stores content or has access to content for a plurality of head contents from a plurality of sources. The web page generator 240 also interacts with a conversation algorithm 210 to obtain a conversation interface for rendering at the website alongside the content. In one embodiment, the conversation interface for starting and sharing private conversation is provided in the form of a conversation widget 105. The interface provided by the conversation widget 105 enables an initiator to start a private conversation, select a plurality of users from a plurality of social networking sites and/or address books from one or more communication providers to share the private conversation, generate a link to the content and the private conversation and to share the link with the selected users. The link to the private conversation is provided only to those users that are selected for sharing the private conversation.

In addition to the conversation interface, the conversation algorithm 210 provides one or more social networking interfaces, such as interfaces SNI 1, SNI 2, SNI 3, etc., and one or more communication provider interfaces (not shown) so as to access the address books available therein. In one embodiment, the communication providers may be other email providers that support address book functionality. These social networking and communication provider interfaces are used by the initiator to access the initiator's social networks and communication provider's websites and to extract contact and electronic address book information so that friends/family members may be invited from these social sites/address books to participate in a private conversation initiated by the initiator. In one embodiment, the users selected to participate in the private conversation may be anyone that has an email address. In another embodiment, in addition to using email address identifiers of a user for inviting the private conversation, other identifiers associated with a user, such as instant messenger (IM) handle, mobile phone number, session initiation protocol (SIP) handle, etc., may also be used.

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

Continuing to refer to FIG. 1, the algorithm stores the contact information of a plurality of users that are invited by the initiator to participate in the private conversation, within a user group/user database 235 for subsequent mining. The plurality of users are socially connected/related to the initiator. The user group database 235 is a repository for holding contact information of the plurality of users who were previously selected or are currently being selected by the initiator for participating in the private conversation for the selected content.

The web page generator 240 formats the selected content, the conversation interface and the one or more social network interfaces into a webpage and forwards the formatted webpage to the client for rendering, in response to the selection of the content by the initiator. The web page generator 240 may also include one or more promotional media content that may or may not be related to the context of the content when generating the web page. The web page with the conversation widget and social network interfaces is rendered at the client.

The initiator may select the conversation widget to start a private conversation and share the private conversation with a select set of users within the initiator's social network for the selected content. The conversation widget, when selected, provides the initiator with an interface that enables the initiator to provide comment related to the content and select one or more users for sharing the private conversation. The widget may interact with the conversation algorithm on the server side to obtain a list of users that the initiator has interacted with in the past and allow the initiator to select the users from this list. If this is the first time the initiator is generating a private conversation and there is no user list to select from, then the conversation interface provides access to the initiator's social networking sites and the initiator's address book so that the initiator can select one or more users' contact information and use the contact information of the selected users to send an invite with a link to participate in the private conversation. As mentioned earlier, the users may be associated with different modes of communication including, but not limited to, email, instant message (IM), mobile phone, SIP, etc. As a result, the contact information may include an email address, an IM handle, mobile phone number, SIP handle, etc. The private conversation is inline within a context of the content and is open only to those that have been selected and invited to participate. Other users who are not part of the private conversation may select the same content on the same website and will only be able to view the content and not the private conversation that was initiated by the initiator. Upon initiating a private conversation for the selected content using the conversation widget, the selected users' contact information is updated into the user group/user database 235 for subsequent use by the initiator.

In one embodiment, the initiator may select any one or more of the social networking interfaces, SNI 1, SNI 2, SNI 3, etc., and communication provider interfaces (not shown) provided on the webpage alongside the content to import contact information of users that are socially related to the initiator from the social networking sites and use this imported list to select the users for participating in the private conversation initiated by the initiator. The initiator may not only select individual users but may also select a previously defined one or more user groups. Once the users are selected for sharing the private conversation, a new user group may be defined to include all the users/user groups that were selected for sharing the private conversation. The newly defined user group is updated to the user group database for use during subsequent conversation sharing and may contain one or more user groups within. Alternately, the individual users may be added to an existing user group and this update is stored in the user group database for use when generating subsequent private conversations.

Once the users are selected for sharing the private conversation, a notification is generated and forwarded to the selected users inviting the users to participate in the private conversation. The notification is formatted to comply with the reporting requirements of the different users mode of contact. For instance, the notification to the participating user informing of the availability of a private conversation can be in the form of an email notification, an update to the participating user's social network stream, a universal header notification at a specific website so that the participating user may be able to access and view the notification by accessing the social networking site or a specific website, an instant message, a short message service (SMS) notification, etc. The above list is exemplary and should not be considered limiting. As a result, other tools or forms of notification provided by various social networking sites and communication providers may be used, as applicable, so long as the privacy of the conversation can be honored and maintained. The notification is provided to each of the participating users informing of any and all activities available within the private conversation. It should be noted herein that the notification is provided only to those users that are selected for participating in the private conversation. As a result, other users may be able to access only the content and not the private conversation.

In one embodiment, upon receiving a notification for the private conversation, the participating user may click on the link and access the selected content and the private conversation associated with the content at the website. In another embodiment, a participating user may access the private conversation without any link. For instance, a participating user may or may not have provided authentication information earlier during a session login to the website and may happen to navigate to the selected head content on the website for which a private conversation has been initiated. Since the participating user is amongst the selected set of users that are granted access to the private conversation for the head content, the participating user will be able to access the private conversation and participate in it. The participating user may respond to the conversation by posting comments or reply to existing comments. When the participating user posts comments or replies, a notification is automatically sent to all the other participating users including the initiator informing of the new comment/response (i.e. activity) within the private conversation. The participating users or the initiator may invite additional users to participate in the private conversation. Any and all comments provided by the initiator or by other users are stored in a comments/responses database 230 and are retrieved for presentation when the users access the link provided in the notification. In the instance where either the participating users or the initiator invite additional users, the contact information of the additional users are updated to the newly created or existing user group and subsequently to the user group database for subsequent use.

Figure 2A:
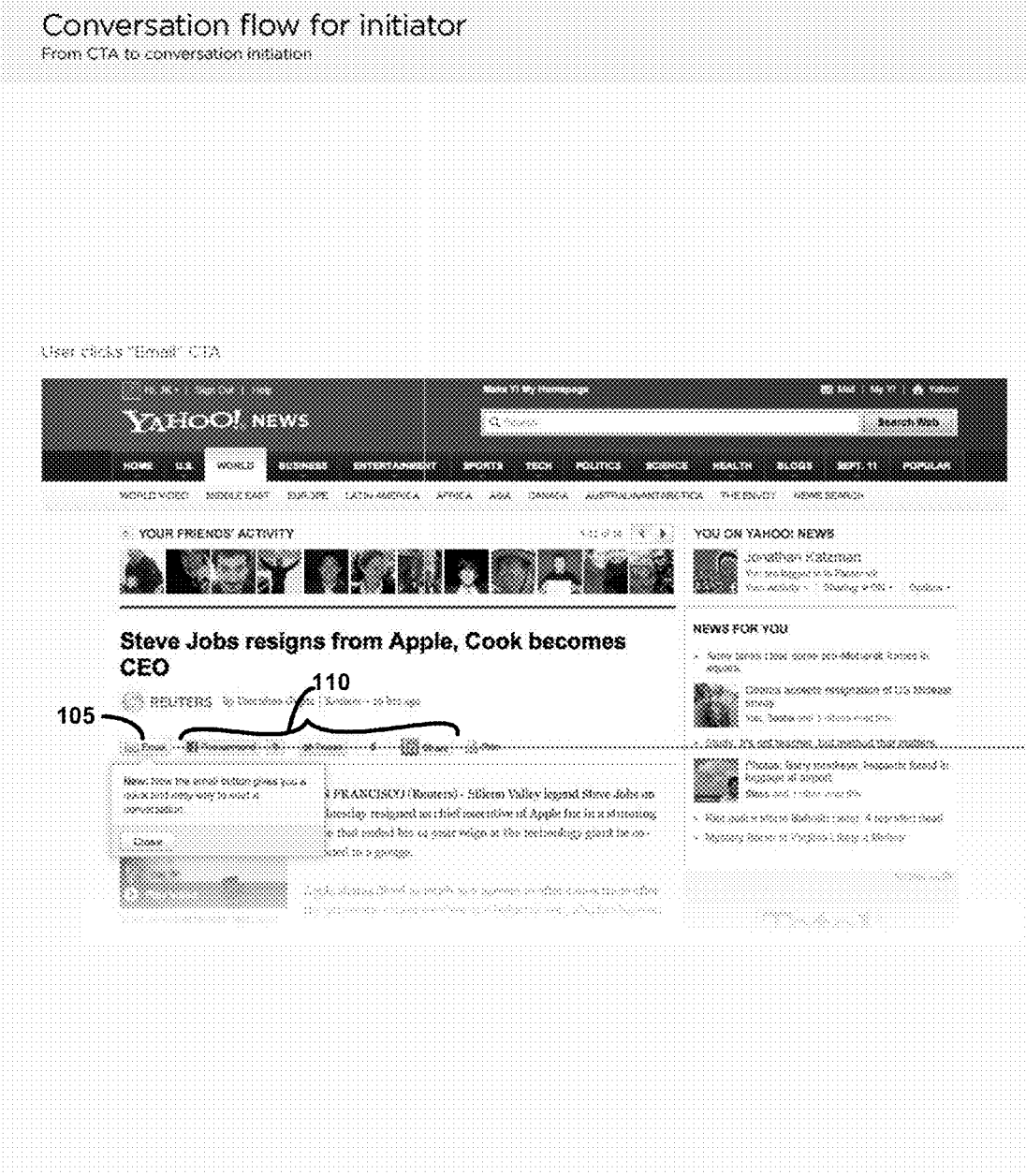
FIGS. 2a-2d illustrate process flow for an initiator to generate and share a private conversation with other users, in one embodiment of the invention.
Figure 2B:
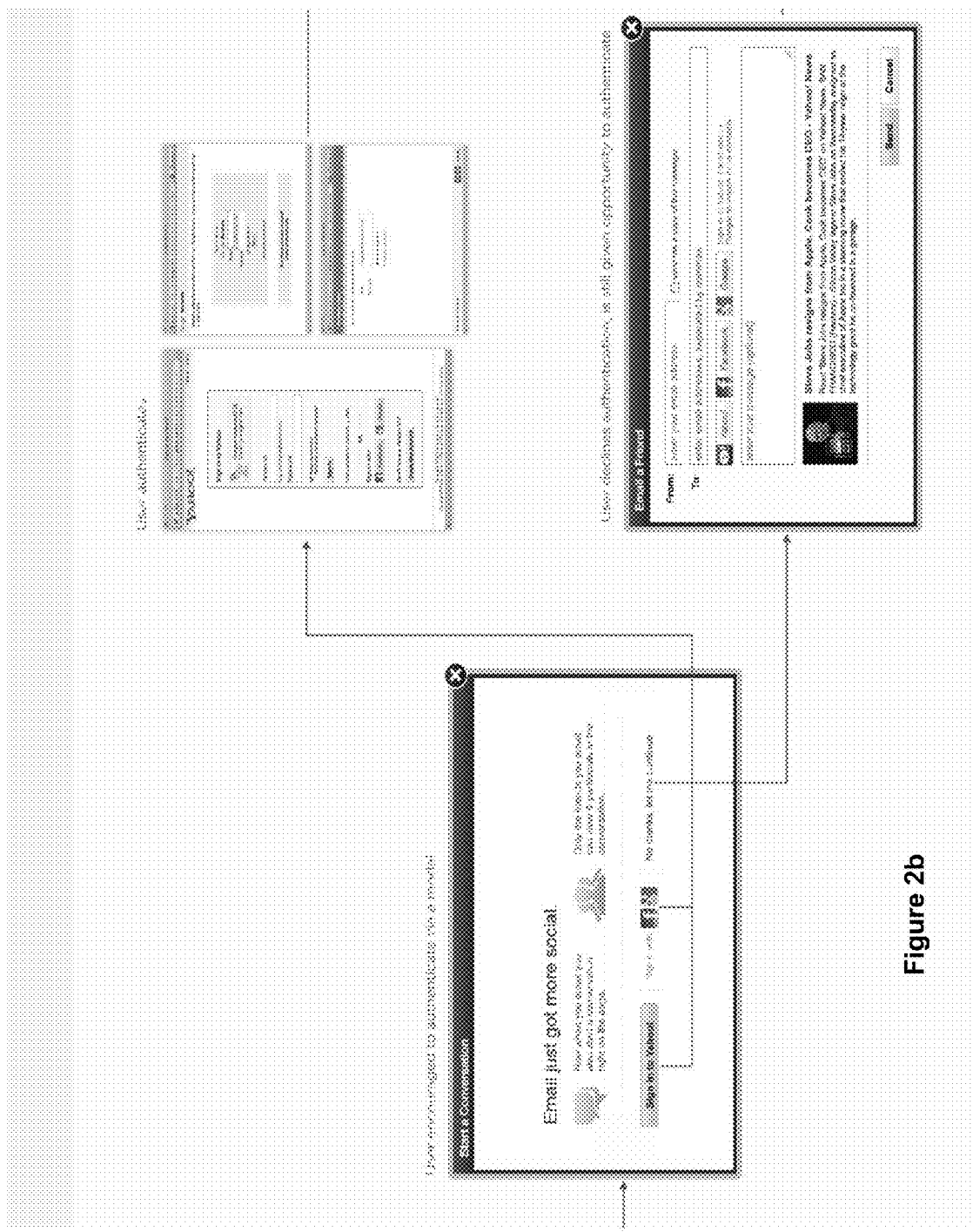
Figure 2C:
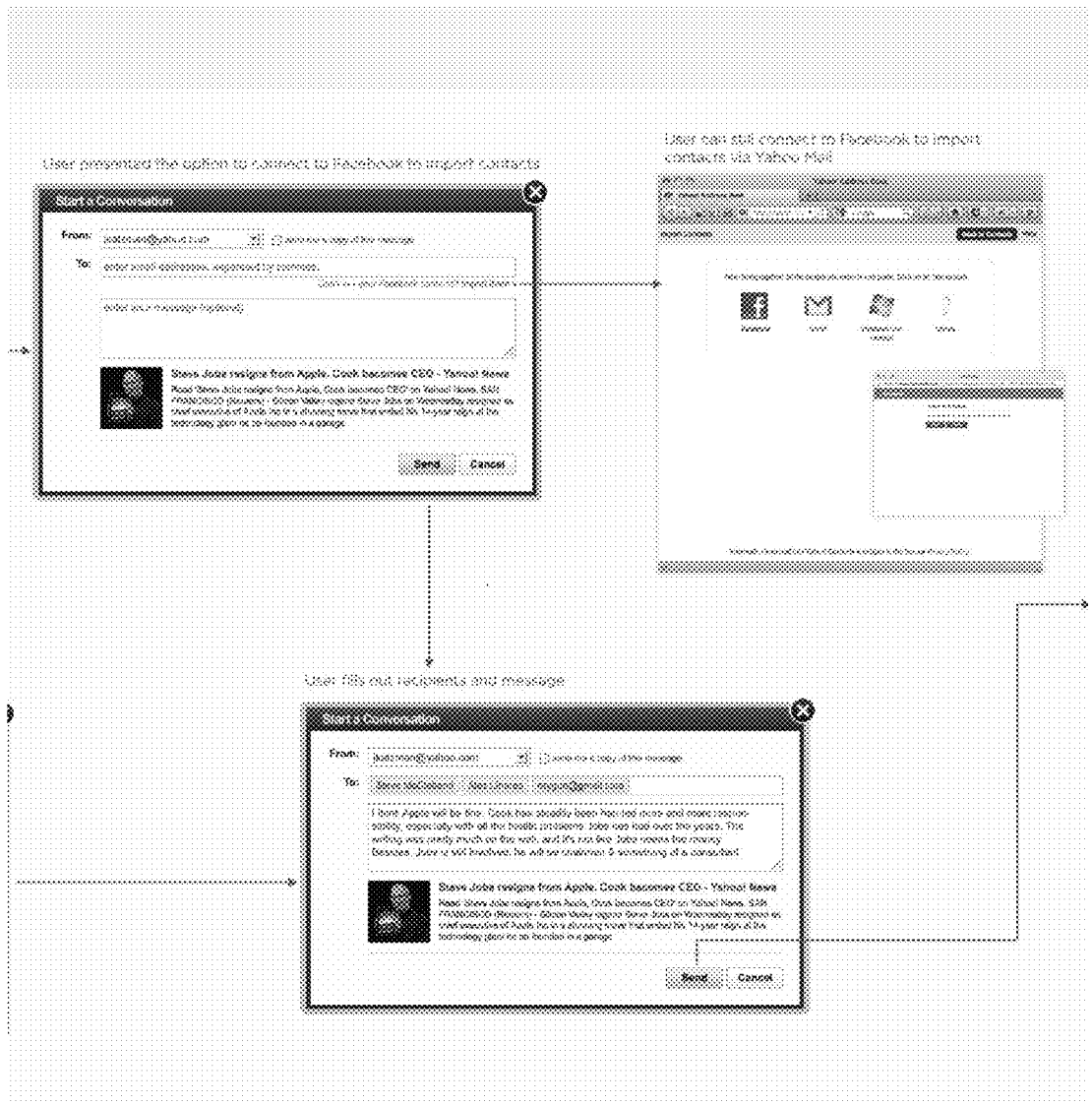

FIGS. 2a-2d illustrate sample screen renditions identifying a process flow using a communication interface used by an initiator to start a private conversation and invite one or more users to join in the private conversation, in one embodiment of the invention. When the initiator selects a particular content to view and to start a private conversation, the initiator is provided with the webpage illustrated in FIG. 2a. The webpage includes information related to the selected content and a mechanism, such as the conversation widget 105, for initiating the private conversation. In the embodiment illustrated in FIG. 2a, the conversation widget is in the form of an Email option. It should be noted that the Email option is one example of a conversation widget and should not be considered restrictive. As a result, other forms or types of conversation widgets may be presented as deemed appropriate. In addition to the conversation widget, the webpage also includes links to other social networking sites 110 for the initiator to use to access the user's contact list/address book. When the initiator selects the conversation widget (i.e. Email button), a conversation widget interface, such as an Email interface, is provided for the initiator, as illustrated in FIG. 2b. The Email interface includes a sign-on/authentication page, such as an Email sign-on page, to authenticate the initiator. In addition to the authentication page, the Email interface also provides a selection screen to allow the initiator to select one or more users to share a private conversation related to the selected content. In addition to the webpage providing access to social networking sites to import user contact information, the selection screen within the conversation widget (i.e. Email interface) also provides the ability to import user contact information so as to allow the initiator to select additional users for participating in the private conversation, as illustrated in FIG. 2c.

Figure 2D:
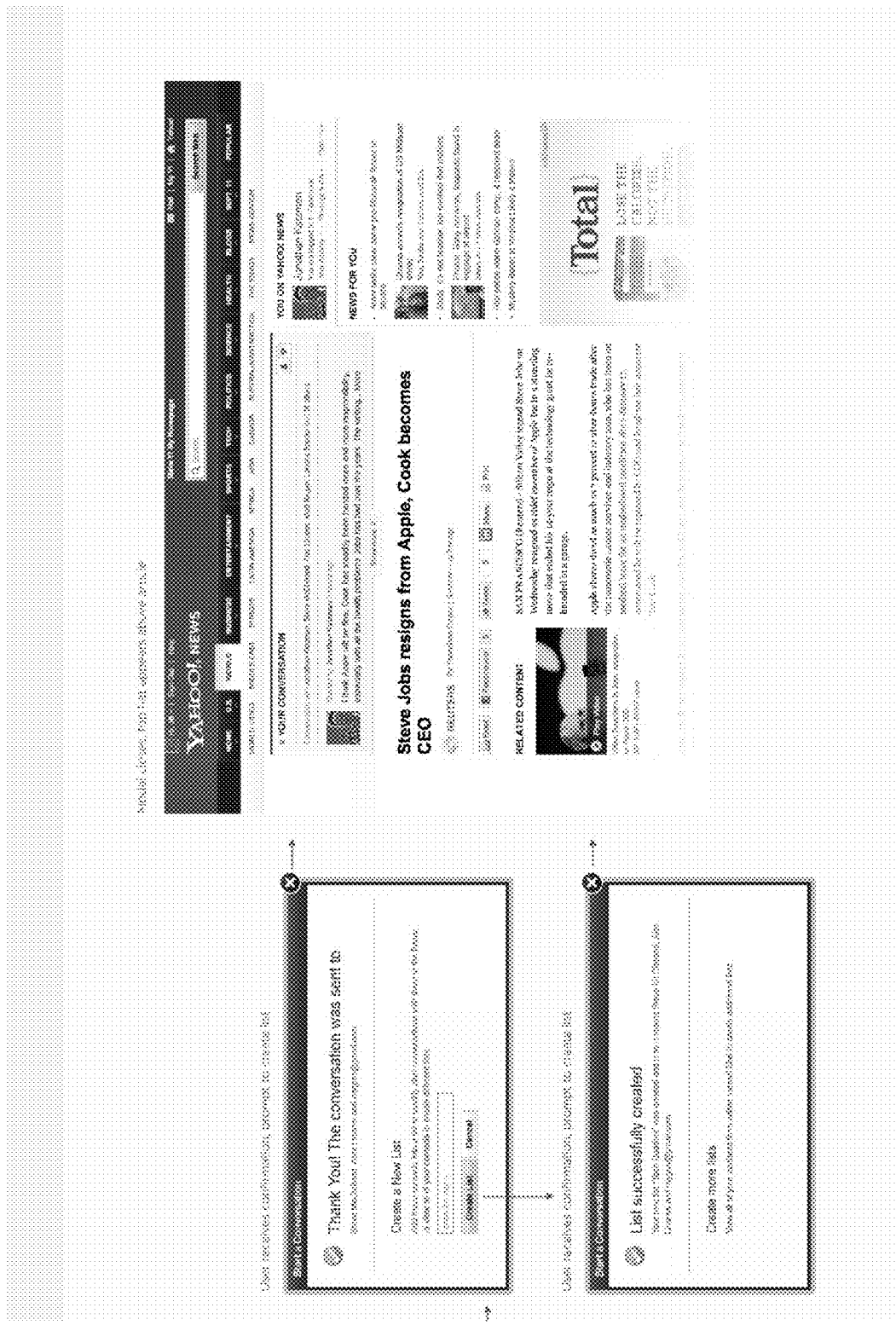

The initiator fills out the participating users contact information, such as email contact information, social networking site contact information, etc., in the selection screen and the comment related to the content in a comment section of the selection screen. The information from the selection screen is provided in the form of a link within an email message to the selected recipients (i.e. participating users). The link in the email provides access to the selected content and to the comment provided by the initiator. The online screen view of the initiator includes the comment over the selected content, as illustrated in FIG. 2d. The comment appears above the selected content article as a "top hat" content. The initiator is also provided with an option to create a user group to include a list of all the users selected for participating in the private conversation, as illustrated in FIG. 2d. As mentioned earlier, the user group may be used by the initiator for sharing other private conversations related to other content on the website.

Figure 3A:
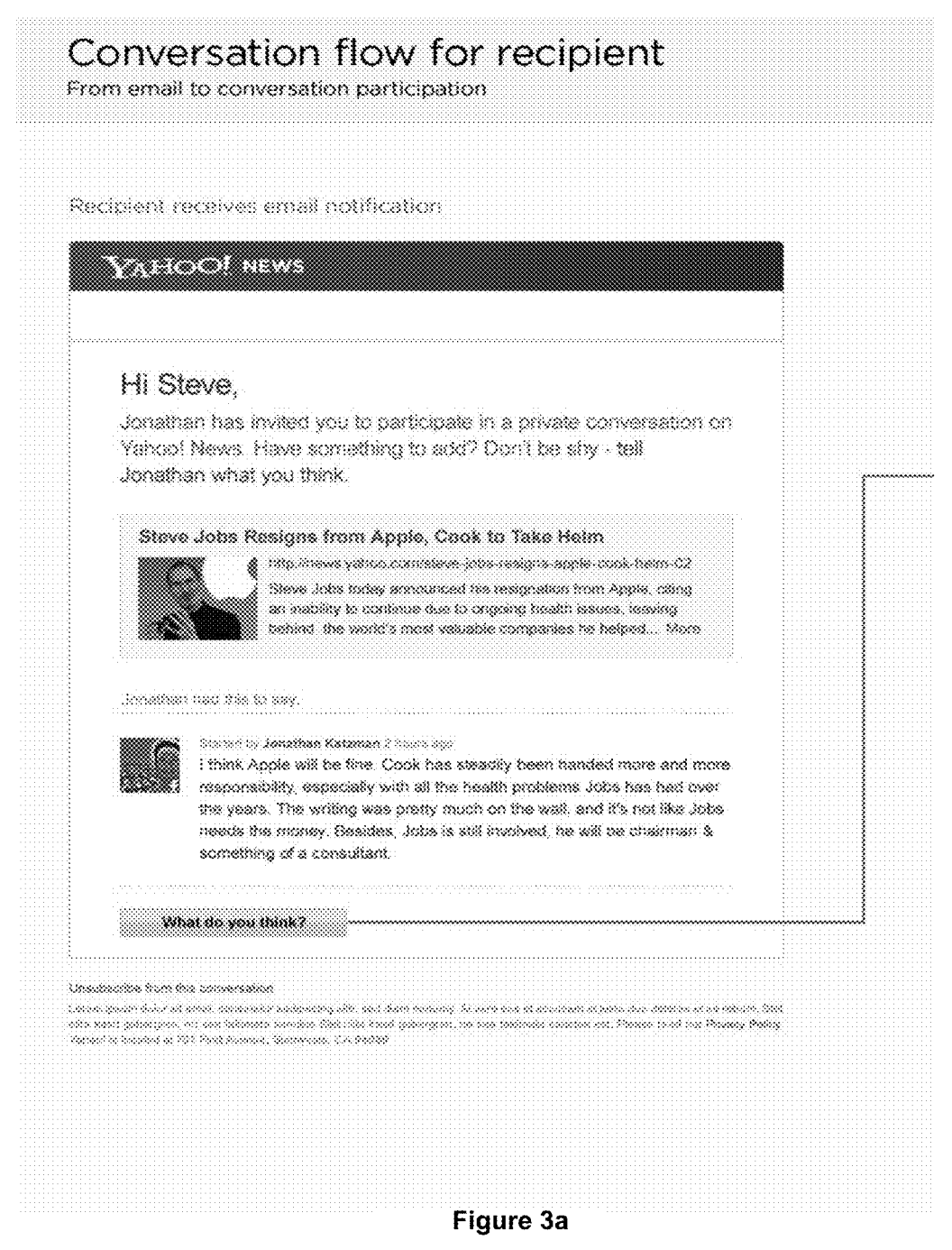
Figure 3B:
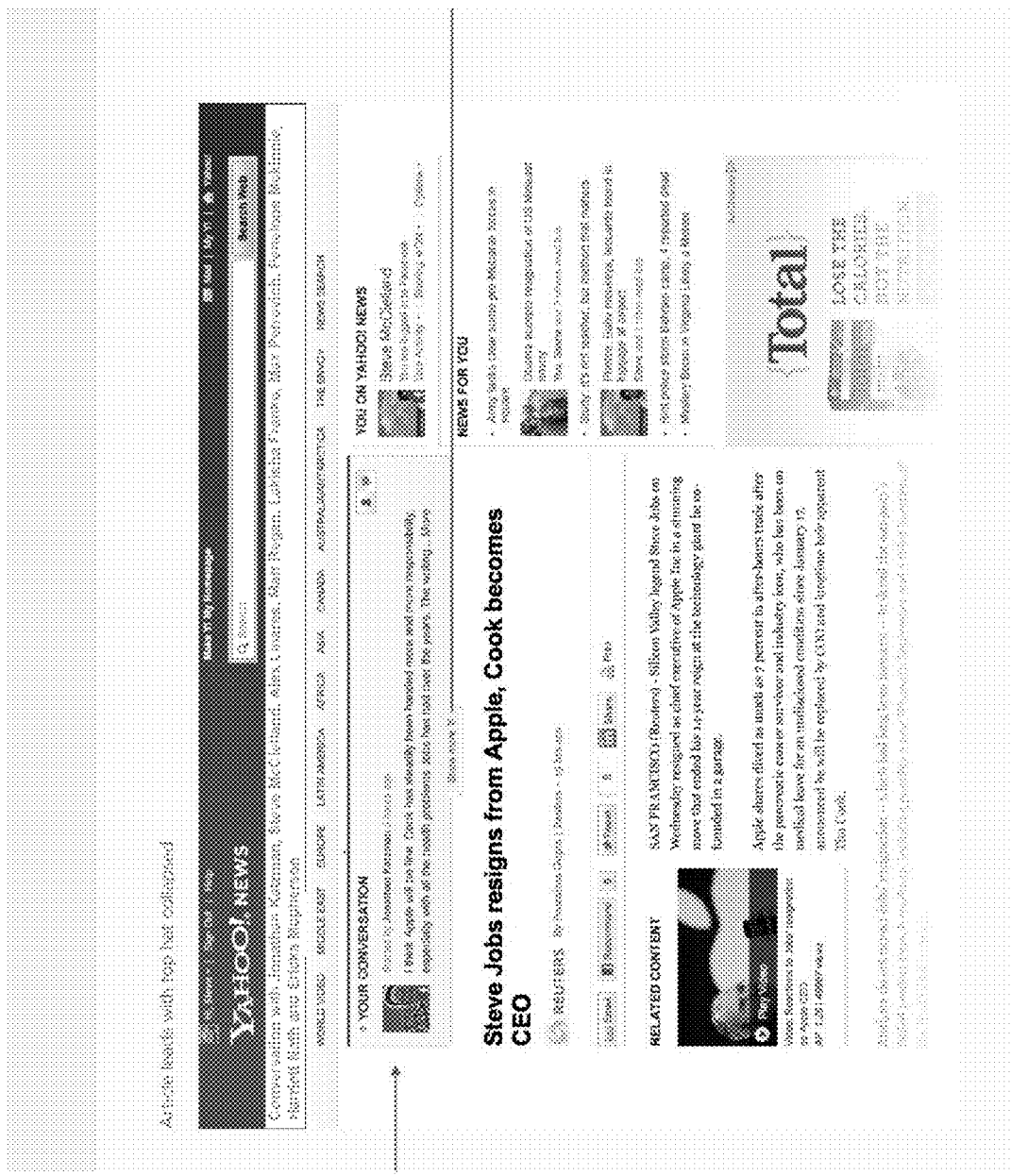

FIGS. 3a-3f illustrate exemplary screen views associated with a private conversation flow for recipients, in one embodiment of the invention. A participating user or a recipient receives a notification via email, in one embodiment, indicating that the recipient is invited to participate in a private conversation initiated by the initiator, as illustrated in FIG. 3a. In one embodiment, an email notification is provided that includes a link providing access to the content and the comment/private conversation provided by the initiator. In one embodiment, when the recipient selects the link, the recipient is led through an authentication process prior to being allowed access to the webpage with the comment from the initiator. When the user is able to access the webpage with the content through the link, the comment from the initiator is provided at the top of the selected content, as illustrated in FIG. 3b. In one embodiment, only portion of the comment is presented on the webpage along with the original content with an option to expand on the comment by providing an interactive option, such as a "top hat", as illustrated in FIG. 3b. In addition to providing the comment on the webpage, a list of recipients who have been invited to participate in the conversation is also provided. For instance, as illustrated in FIG. 3b-3e, the list of participants may include Jonathan Katzman who is the initiator, and other participants including Steve McClelland, Alex Linares, etc. Each participant, thus, is made aware of other participants that are privy to the conversation so that the participants can share their responses with the invited participants accordingly.

Figure 3C:
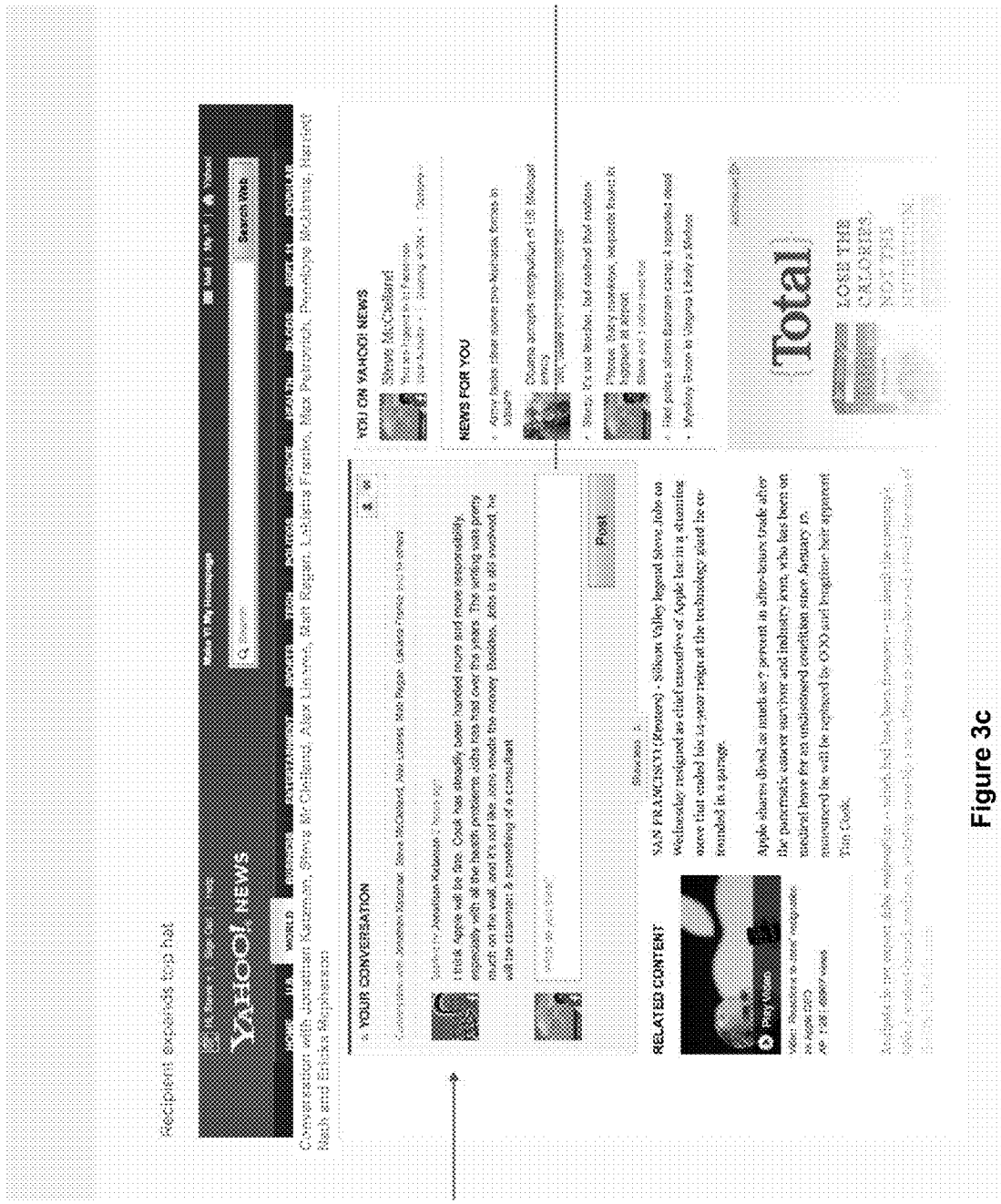
Figure 3D:
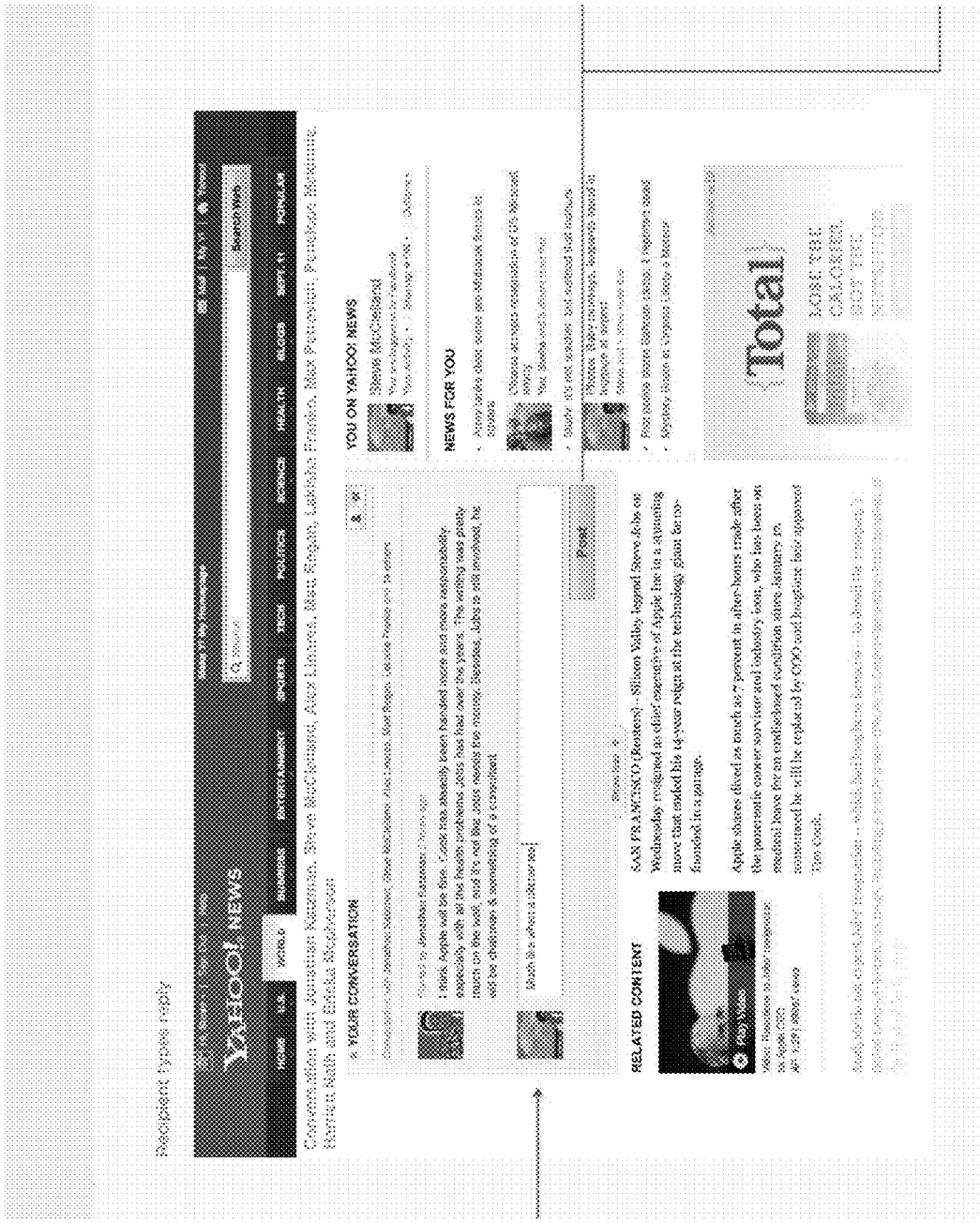
Figure 3E:
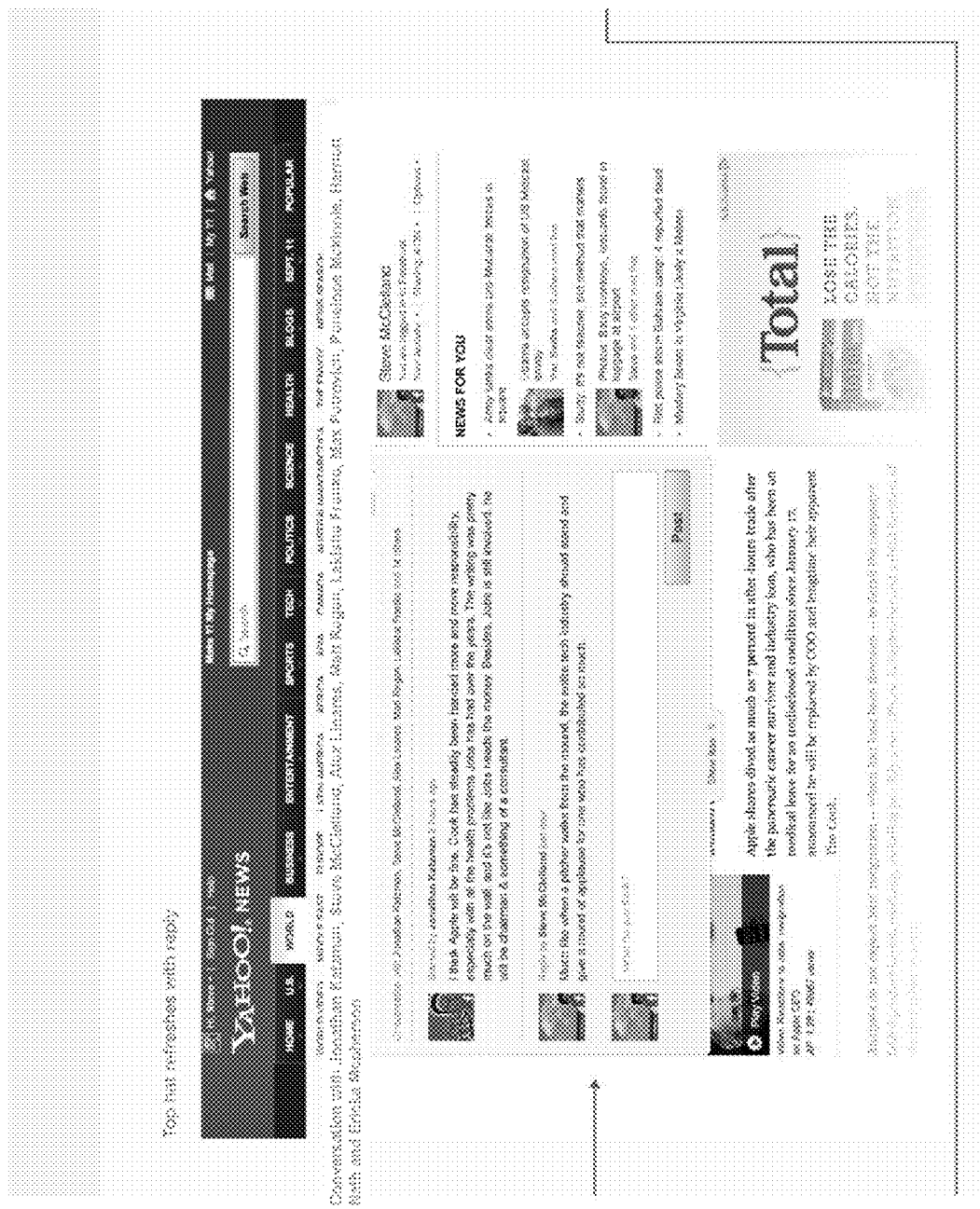

The user may be able to expand on the comment provided by the initiator in the webpage or other users and be able to participate in the conversation, as illustrated in FIG. 3c. The webpage also provides the ability for each participant to comment on the content or other users' comments, as illustrated in FIG. 3d. When the user provides his comment either in response to the comment by other users or to the selected content, the webpage is refreshed with the comment. In one embodiment, the comment is refreshed such that it is provided in a chronological order with the oldest comments on the top and the latest comments at the bottom, as illustrated in FIG. 3e. In another embodiment, the comments are presented in a reverse chronological order with the latest comments on the top and the oldest comments at the bottom, with all of the comments presented above the selected content article. In addition to refreshing the webpage with the latest comments, a notification is automatically sent to all the participants including the initiator notifying them of the latest activity (i.e. comment from a participant) in the private conversation, as illustrated in FIG. 3f. The notification, in one embodiment, may be in the form of a reply email to the original email from the initiator providing an updated link to the latest conversation. Other participants may review all the comments and provide their own comments by accessing the link provided in the notification.

Figure 4A:
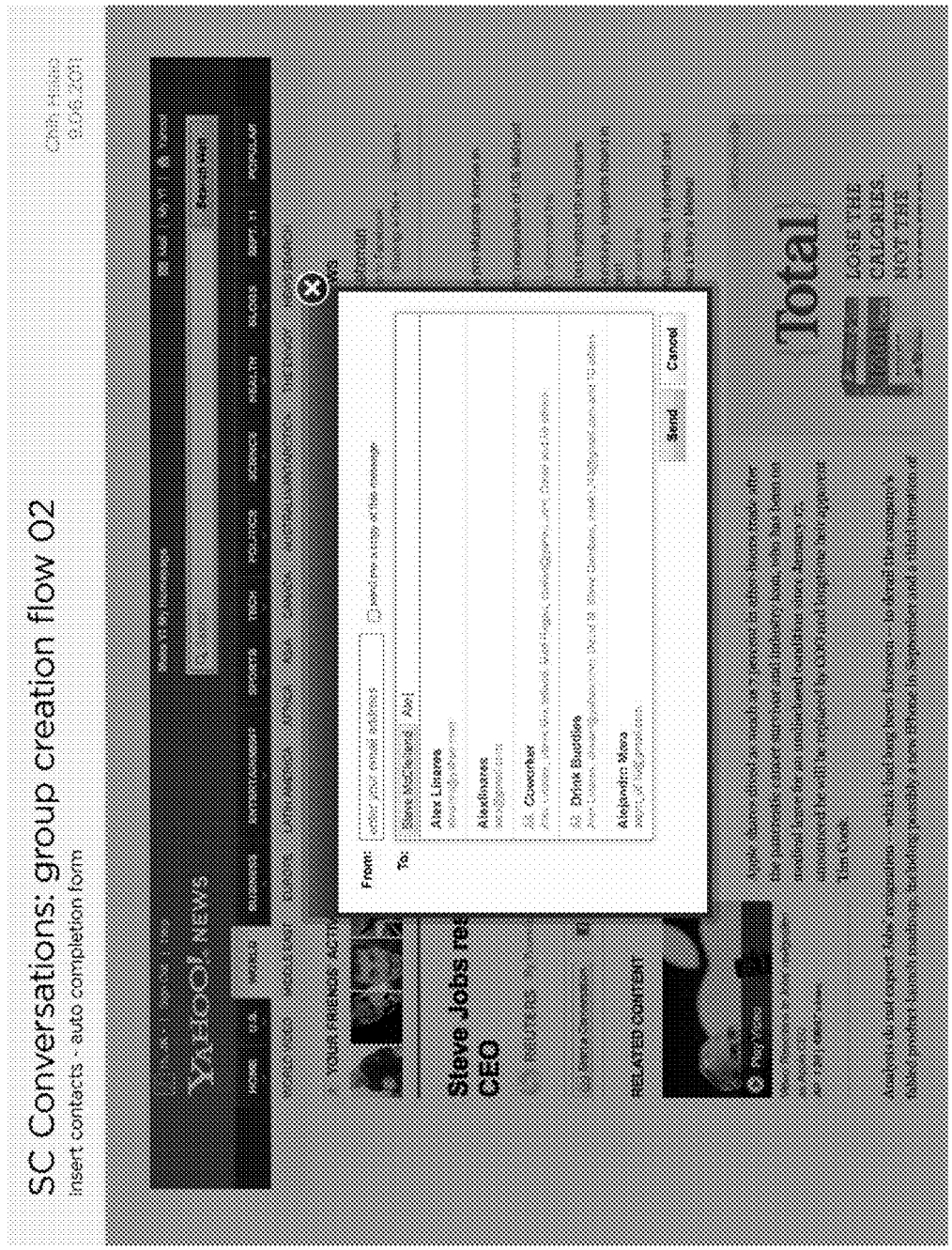
FIGS. 4a-4d illustrate process flow to create a user group for sharing private conversations, in one embodiment of the invention.
Figure 4B:
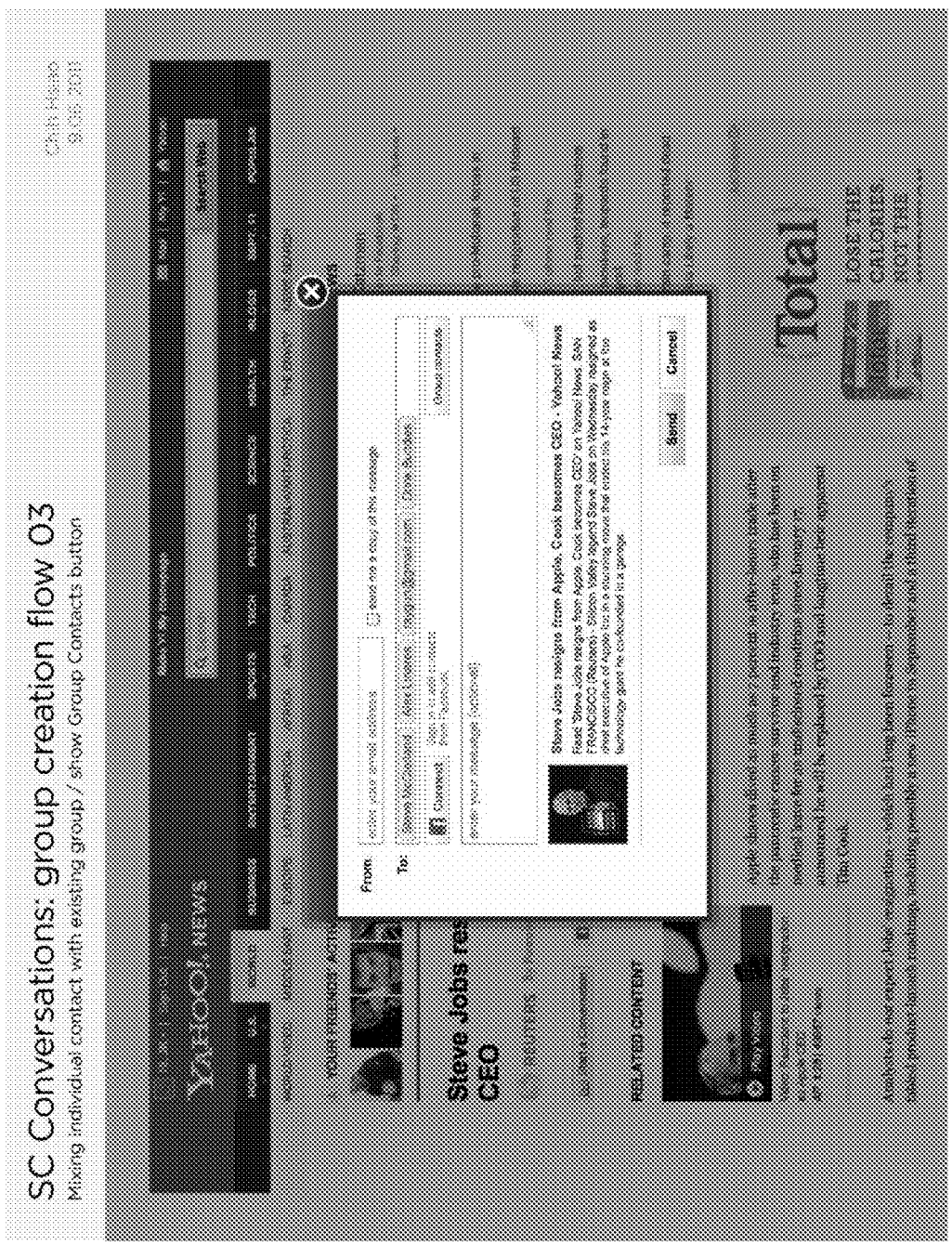
Figure 4C:
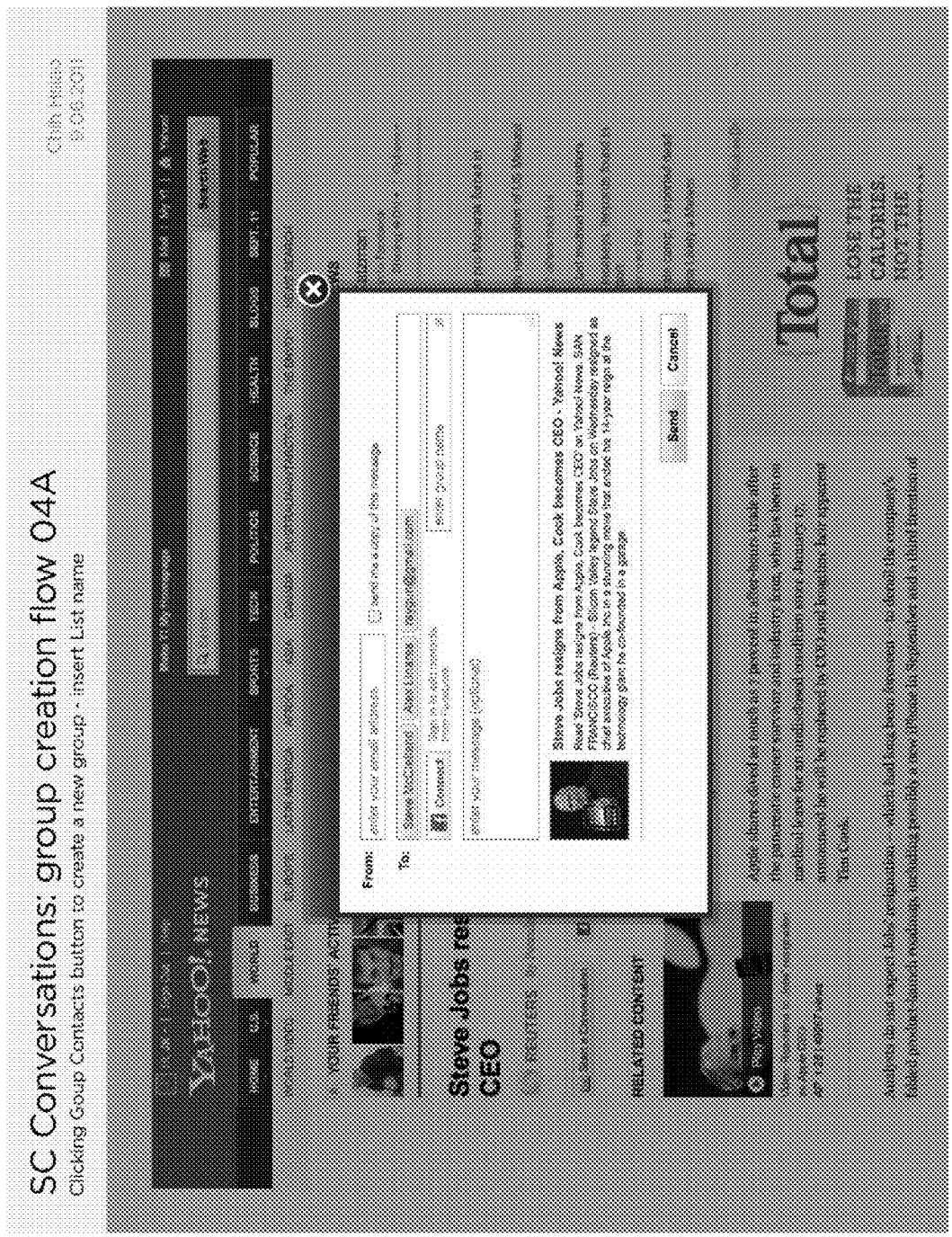
Figure 4D:
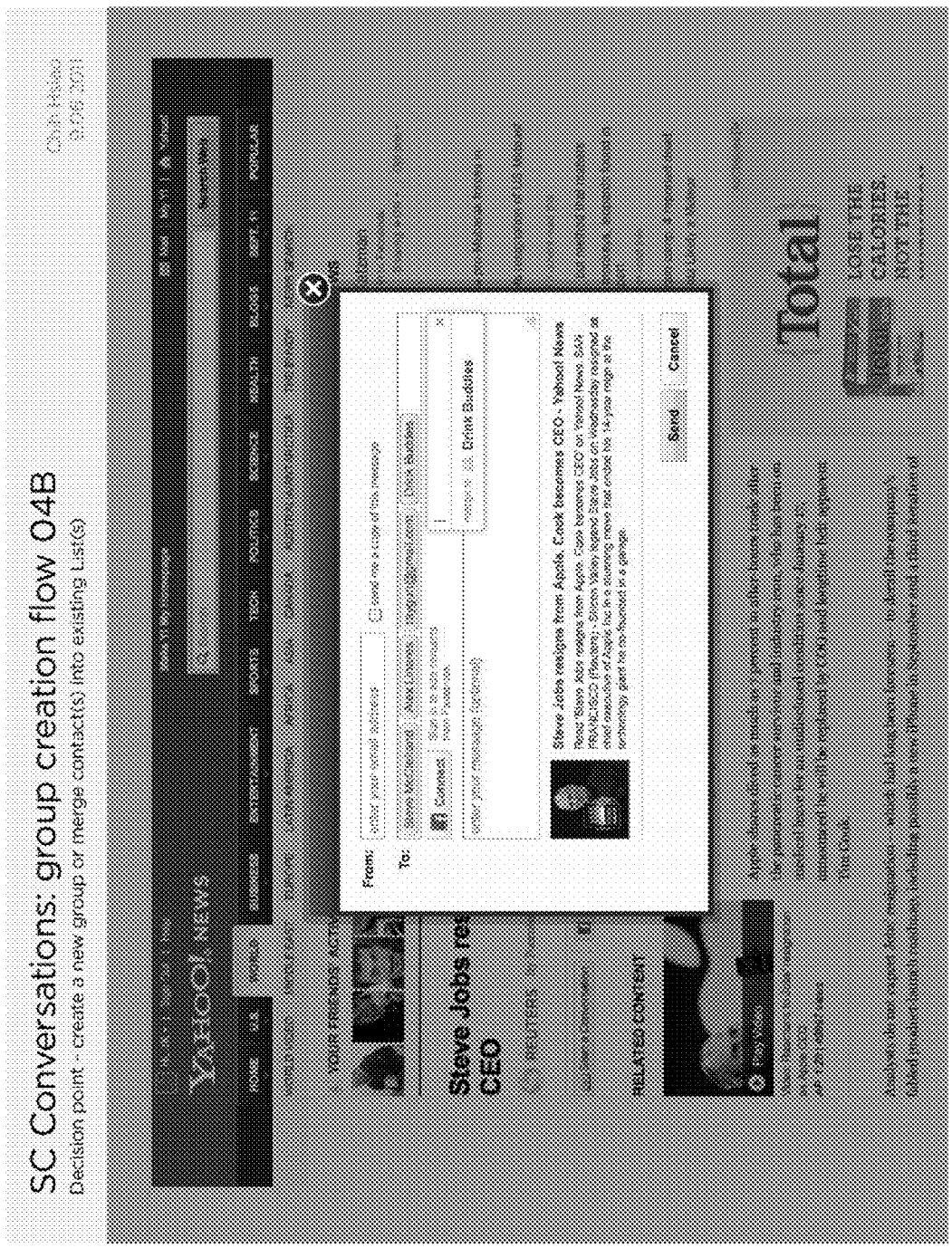

FIGS. 4a-4d illustrate snapshot of user interface screens encountered by an initiator when selecting users to share a private conversation related to a content article selected on a website. When the initiator selects a conversation widget, such as an Email widget or a "Start a conversation" widget, to start a private conversation, the initiator is presented with a user interface screen that allows the initiator to select users to send a notification of the private conversation. In one embodiment, the initiator may be presented with a list of user contacts and user groups from which to select one or more users/user groups, as illustrated in FIG. 4a. The list of user contacts may have been obtained from a plurality of social network sites and maintained in a contact list for the initiator. The list of user contacts may also include an option, such as "Group Contacts", to enable the initiator to select user groups that the initiator may have created while sharing an earlier conversation or from his contact list from social networking or other related sites. The initiator selects one or more users/user groups from the contact list, as illustrated in FIG. 4b. Upon selecting users/user groups from the list, the initiator may be presented with an option, such as "Enter group name", to create a new user group from the individual user contacts and user groups selected by the initiator, as illustrated in FIG. 4c. Alternately, the initiator may be provided with an option to merge the selected individual user contacts into a selected user group, as illustrated in FIG. 4d. Based on the option selected by the initiator, either a new user group is created mixing individual contacts with user group contacts or the individual contacts are merged/updated into an existing user group. The updated user group is saved in a user content database for the initiator so that it could be used during subsequent sharing of private conversation.

Figure 5:
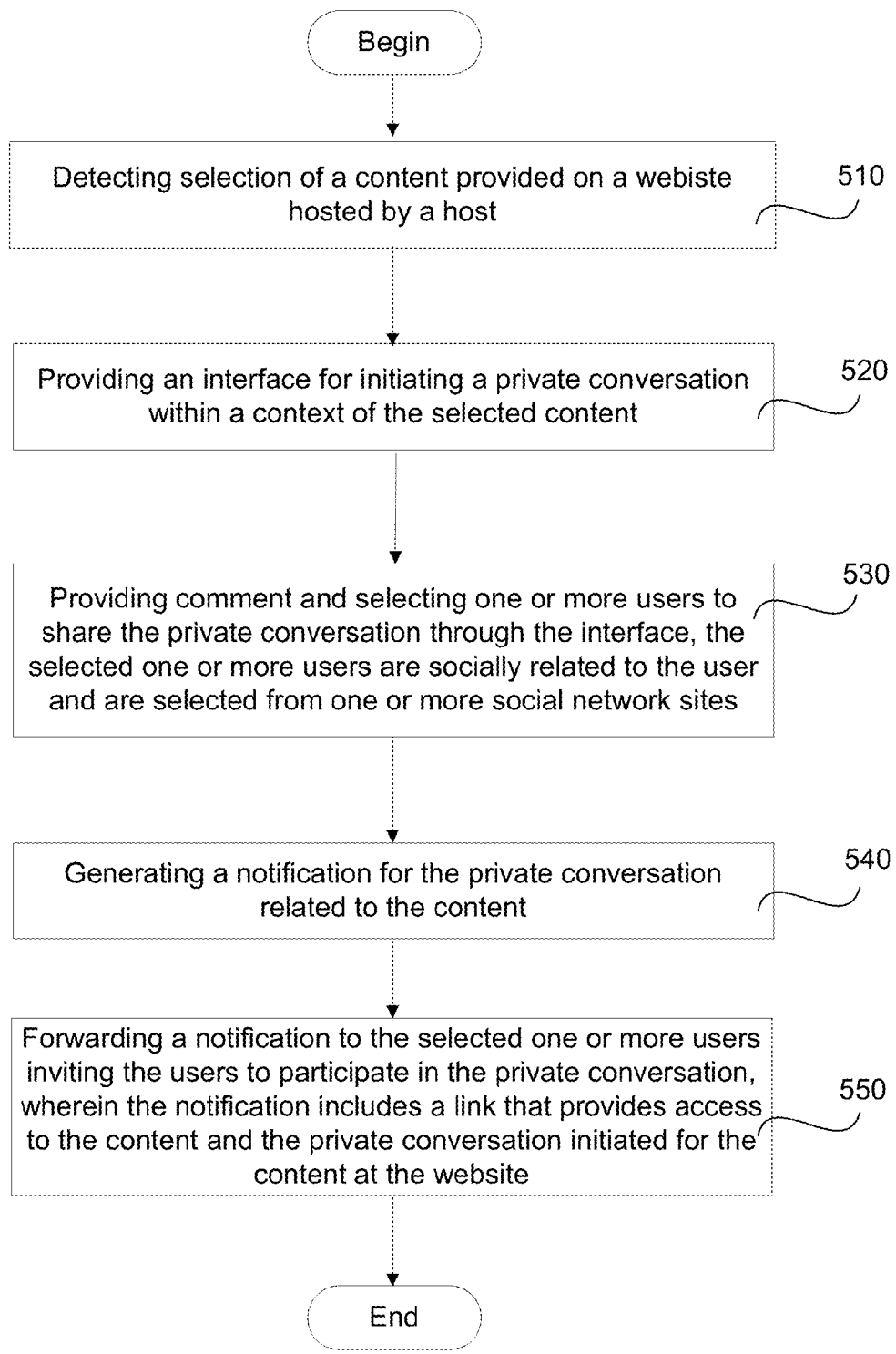
FIG. 5 illustrates a flow chart of process flow operations for enabling creation and sharing of private conversation with a plurality of users, in one embodiment of the invention.
Figure 6:
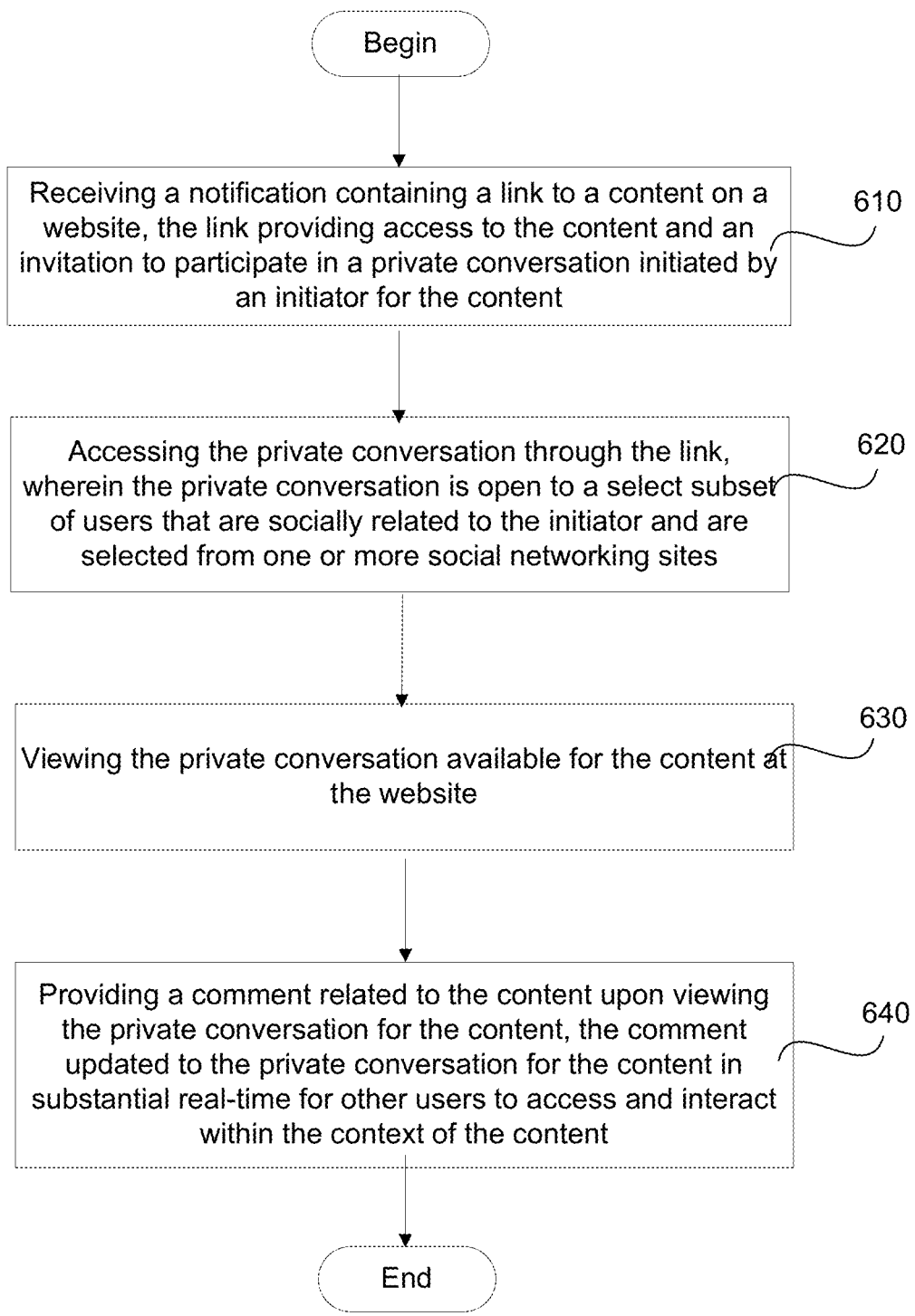
FIG. 6 illustrates a flow chart of various process flow operations used for enabling generation and sharing of private conversation with a select group of users across a spectrum of social network, in an alternate embodiment of the invention.

With the above detailed description of the various embodiments, methods for initiating and sharing a private conversation for a content article published on a website will now be described with reference to FIGS. 5 and 6. FIG. 5 illustrates process flow operations for initiating a private conversation by an initiator and FIG. 6 illustrates process flow operations for a recipient to access and interact with the private conversation. As illustrated in FIG. 5, the process begins at operation 510 wherein selection of a content article published on a website hosted by a host, is detected. The selection of the content is by an initiator who desires to start a private conversation related to the content. In response to the selection, an interface for initiating a private conversation within a context of the content is provided, as illustrated in operation 520. An algorithm available on a server, receives the selection of a content article from a website that includes a plurality of content articles and assembles a webpage with the selected content article's information, one or more social networking interfaces and a conversation interface to initiate and share a private conversation. The private conversation is initiated inline within a context of the content.

One or more users that are socially related to an initiator of the private conversation are selected through the conversation interface to participate in the private conversation initiated by the initiator, as illustrated in operation 530. The users may be selected from a list of contacts available for the initiator at the conversation interface or may be imported from one or more social networking sites or one or more address books available through other communication providers. The conversation interface provides options to import user contact list from the various social networking sites and address books available through other communication providers into the initiator's address book. The user contact list may include individual users contact information as well as information related to user groups. The interface also provides the ability to generate one or more comments related to the content article. Upon generation of comment and selection of one or more participants to participate in the private conversation, a notification is automatically generated for the private conversation related to the content, as illustrated in operation 540. The notification is forwarded to the selected one or more users inviting the users to participate in the private conversation. The notification includes a link that provides access to the content information and to the private conversation initiated for the content at the website. The participants may comment on the content or respond to other participant's comments and such comments are provided inline within the context of the content and are captured as activities. A notification is automatically sent to other users informing them of activity within the private conversation inviting them to participate in the conversation.

FIG. 6 illustrates the process flow operations for a participant in receiving and participating in the private conversation. The process begins when a recipient (i.e. participant) receives a notification containing a link to a private conversation initiated by an initiator for a selected content published on a website hosted by a host, as illustrated in operation 610. The link provides access to the selected content and to the private conversation that has been initiated within the context of the selected content. The participant accesses the private conversation using the link, as illustrated in operation 620. In one embodiment, the link may include a user interface that requires user authentication by the participant prior to providing access to the private conversation. The user authentication enables the initiator to control access to the private conversation and allow only those users that have been selectively chosen by the initiator. Upon successful authentication, the participant is able to access the private conversation and view the comments available inline within the context of the content, as illustrated in operation 630. The participant may participate in the private conversation by providing comments related to the content or by providing comments in response to comments from other participants, including the initiator, as illustrated in operation 640. The comment from the participant is updated in substantial real-time to the private conversation and a notification is automatically sent to other participants informing the other participants of a newly generated activity in the private conversation. The other participants may access the comment using the link within the notification, view and respond with additional comments. The process of viewing comments, receiving responses and providing notifications to the participants will continue so long as the participants are actively participating in the private conversation.

It should be noted herein that an initiator or a participant may be involved in more than one private conversation at any given time. In fact, the initiator may initiate distinct private conversations for the selected content with a plurality of users separately and participate in these private conversations simultaneously. Along similar lines, the participants may be involved in a plurality of private conversations initiated by an initiator or may initiate a private conversation himself.

The embodiments of the invention provide ways to initiate a private conversation inline within a context of a content that an initiator has selected for viewing on a website. The private conversation is available only to those who are invited to join enabling users to hold private conversation on any content available on any website. The private conversations are held within a context of the content enabling the participants to be able to relate more to the content. The conversations are mostly inline to the content. In some embodiments, comments to the conversation may be provided in an offline mode. For instance, an initiator may start a conversation within a news website and invite a plurality of users from a spectrum of social networking sites. When a user from a social networking site comments on the conversation, the comment is made outside of the news website. For instance, a participating user may access the private conversation through an email and may provide comments to the conversation as a reply to the email or through an Instant Messenger (IM) service. Alternately, the user may access the private conversation through his mobile device and respond to the private conversation using a short message service (SMS). These responses are offline comments provided by the participating user outside of the selected content. This offline comment outside of the news website is captured through a relevant medium/device used by the participating user (i.e. participant) and updated to the private conversation within the news website and is made available to other participants so that the other participants may be able to view and comment on the offline comment in addition to other comments provided inline. This ability to integrate the conversations from different social networking sites provides for a more robust content sharing tool that increases chances of user interaction at the relevant head content thereby enhancing user's engagement.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for enabling a private conversation for a content provided on a website, comprising:
    detecting selection of the content by an initiator at the website provided by a host, the website having an initial page layout for the content;
    providing an interface for initiating the private conversation within the content in relation to a context of the selected content;
    receiving a comment and a selection of one or more users that are invited to participate in the private conversation through the interface, the comment being part of the private conversation, wherein the selected one or more users are socially related to the initiator and are selected from one or more address books or one or more social networking sites;
    generating a notification with a link to the selected content and the private conversation related to the selected content rendered on the website; and
    forwarding the notification with the link to the selected one or more users invited to participate in the private conversation, the notification being formatted to comply with reporting requirements of different modes of contact of the one or more users, the link providing access to the selected content and to the private conversation initiated within the selected content at the website to allow the one or more users and the initiator to carry out the private conversation related to the selected content asynchronously using the different modes of contact used in the notification;
    integrating a conversation module into the website, the conversation module being oriented adjacent to the selected content and the integration of the conversation module changing the initial page layout so that both the conversation module and the selected content are rendered together;
    wherein the access to the private conversation provided within the conversation module is available to only the selected one or more users invited to participate in the private conversation via the changed initial page layout, wherein the private conversation is integrated within the conversation module to allow the selected users to access the private conversation during viewing of the selected content;
    wherein other users that are not part of the private conversation are allowed to access and view only the selected content of the website having the initial page layout.

2. The method of claim 1, wherein providing an interface further includes,
    providing a conversation widget at the content of the website to initiate the private conversation.

3. The method of claim 1, wherein receiving a selection further includes,
    presenting a plurality of users that are socially related to the initiator, the plurality of users selected from the one or more social networking sites or from a contact list associated with the initiator, the contact list obtained by accessing an address book of the initiator; and
    receiving a selection of a subset of the plurality of users from the one or more social networking sites and from the contact list to share the private conversation.

4. The method of claim 3, wherein presenting further includes,
    importing one or more lists of contacts to the initiator's address book from anyone of the one or more social networking sites or one or more address books available through other communication providers;
    identifying users from the contact list obtained from the address book of the initiator; and
    rendering the one or more lists of contacts identifying the one or more users ,
    wherein the rendered one or more lists of contacts includes the imported list of contacts and the contact list obtained from the address book of the initiator and wherein the list of one or more users includes one or more individual users and one or more groups of users.

5. The method of claim 3, wherein receiving a selection further includes,
    dynamically generating a participant group of the subset of the users selected to share the private conversation; and
    tagging the participant group with one or more of user attributes of the initiator selecting the content on the website, the tagging enabling the participant group to be available for the initiator for initiating subsequent private conversations for any content provided on the website.

6. The method of claim 1, wherein the link is provided as a uniform resource locator (URL) link.

7. The method of claim 1, wherein the link is forwarded through one or more channels of communication based on requirements established by mode of contact associated with each of the selected one or more users.

8. The method of claim 1 further includes,
    allowing the initiator or any one of the one or more users to invite one or more additional users to participate in the private conversation using the interface.

9. The method of claim 1, further includes,
    receiving a comment from a particular user in response to the forwarded link for the private conversation initiated for the content;
    updating the comment received from the particular user to the private conversation rendered alongside the content on the website; and
    automatically generating the notification to the selected one or more users and the initiator informing of a presence of comment received from the particular user as part of the private conversation provided within the context of the content,
    wherein the notification is forwarded to the selected one or more users and the initiator in the format complying with reporting requirements of the respective users through one or more channels of communication based on the requirements established by the mode of contact related to each of the selected one or more users.

10. A method for enabling a private conversation for a content provided on a website, comprising:

receiving a notification containing a link to the content on the website, the link providing access to the content, the private conversation within the content and includes an invitation to participate in the private conversation initiated by an initiator for the content provided at the website by a host, the website having an initial page layout that includes the content and one or more additional content;

identifying a subset of users that are selected to participate in the private conversation from the notification, wherein the subset of users are social contacts identified from one or more address books, one or more social networking sites associated with the initiator;

integrating a conversation module into the website, the conversation module being oriented adjacent to the selected content and the integration of the conversation module changing the initial page layout so that both the conversation module and the selected content are rendered together, wherein the integration allows the conversation module to be linked to the selected content, such that when a second content is selected from the one or more additional content on the website for holding a private conversation, the page layout of the website is modified to integrate a second conversation module into the website, wherein the second conversation module is oriented adjacent to the second content, the integration allowing the second conversation module to be linked to the second content;

providing access to view the private conversation rendered by the conversation module or the second conversation module via the link, wherein the link provides access to the changed page layout with the integrated conversation module or the changed page layout with the integrated second conversation module, wherein the private conversation is provided within the conversation module or the second conversation module and is available for viewing only to the subset of users; and detecting a comment related to the content generated by at least one of the subset of users in response to viewing the private conversation for the content, the comment updated to the private conversation in substantial real-time, wherein detection of the comment causing automatic generation of the notification with the link that includes the comment, the notification being sent to the subset of users and the initiator informing the subset of users and the initiator of a presence of the comment within the content to access and interact within the context of the content, the notification generated and sent in a format that complies with reporting requirements of respective user's mode of communication.

11. The method of claim 10, wherein providing access to the private conversation further includes, generating an authentication request for authenticating a user prior to allowing access to the private conversation, the authentication request generated using an authentication mechanism and transmitted to each one of the subset of users;

receiving user credentials for authenticating a particular user responding to the authentication request; and allowing access to the private conversation generated within the content upon successful authentication of the particular user.

12. The method of claim 10, wherein the notification containing the link is forwarded through one or more channels of communication based on the requirements established by mode of communication associated with each of the subset of users.

13. The method of claim 10, wherein the link is an URL link.

14. The method of claim 10, wherein viewing the private conversation further includes, viewing a list of participants that are currently participating in the private conversation.

15. The method of claim 1, wherein comments to the private conversation received from the selected users in inline mode or offline mode are updated to the private conversation to allow the initiator and the selected users to view the updated private conversation.

16. The method of claim 10, wherein the modification to the layout of the website further includes hiding the conversation module associated with the selected content, when the second content is selected, such that the website renders the second content and the second conversation module related to the second content, wherein the second conversation module is provided as a link to a second subset of users that are social contacts of the initiator.

17. The method of claim 16, wherein the second subset of users invited to participate in the private conversation in the second conversation module are different from the subset of users invited to participate in the conversation module, the modification of the layout of the website allowing the initiator to simultaneously hold separate private conversations with the subset of users and the second subset of users within context of the content or the second content.

18. The method of claim 10, further includes, identifying a second subset of users that are selected to participate in a second private conversation from the notification;

integrating a second conversation module into the website, the second conversation module oriented adjacent to the selected content, the integration changing the page layout of the website so that the second conversation module is rendered with the selected content; and providing access to view or participate in the second private conversation rendered in the second conversation module via the link, wherein the second private conversation within the second conversation module is available for interaction only to the second subset of users.

* * * * *